(12) United States Patent
Morsch et al.

(10) Patent No.: US 8,407,222 B2
(45) Date of Patent: Mar. 26, 2013

(54) SYSTEM AND METHOD FOR PROCESS CONTROLS IN MASTER DATA MODELING

(75) Inventors: Andreas F. Morsch, Mannehim (DE); Horst F. Schaude, Kraichtal (DE); Ingo Bruss, Heidelberg (DE); Michael H. Bauer, Rastatt (DE)

(73) Assignee: SAP AG, Walldorf (DE)

( * ) Notice: Subject to any disclaimer, the term of this patent is extended or adjusted under 35 U.S.C. 154(b) by 1383 days.

(21) Appl. No.: 11/323,377

(22) Filed: Dec. 29, 2005

(65) Prior Publication Data

US 2007/0162416 A1 Jul. 12, 2007

(51) Int. Cl.
*G06F 7/00* (2006.01)

(52) U.S. Cl. ......... 707/737; 707/741; 707/752; 707/769
(58) Field of Classification Search .......... None
See application file for complete search history.

(56) References Cited

U.S. PATENT DOCUMENTS

| | | | |
|---|---|---|---|
| 6,539,396 B1* | 3/2003 | Bowman-Amuah | 707/103 R |
| 6,701,345 B1* | 3/2004 | Carley et al. | 709/205 |
| 6,789,252 B1* | 9/2004 | Burke et al. | 717/100 |
| 6,985,901 B1* | 1/2006 | Sachse et al. | 707/10 |
| 7,085,773 B2* | 8/2006 | Dorsett, Jr. | 707/104.1 |
| 7,089,583 B2* | 8/2006 | Mehra et al. | 726/3 |
| 7,206,805 B1* | 4/2007 | McLaughlin, Jr. | 709/203 |
| 7,289,964 B1* | 10/2007 | Bowman-Amuah | 705/1 |
| 7,315,826 B1* | 1/2008 | Guheen et al. | 705/7 |
| 7,392,255 B1* | 6/2008 | Sholtis et al. | 707/203 |
| 2001/0007103 A1* | 7/2001 | Breiter et al. | 707/1 |
| 2003/0226109 A1* | 12/2003 | Adamson et al. | 715/513 |
| 2004/0128215 A1* | 7/2004 | Florance et al. | 705/28 |
| 2005/0049993 A1* | 3/2005 | Nori et al. | 707/1 |
| 2005/0097119 A1* | 5/2005 | Bayoumi et al. | 707/102 |
| 2005/0102297 A1* | 5/2005 | Lloyd et al. | 707/100 |
| 2005/0149532 A1* | 7/2005 | Hubbard | 707/10 |
| 2005/0172238 A1* | 8/2005 | Miksovsky et al. | 715/762 |
| 2005/0193061 A1* | 9/2005 | Schmidt et al. | 709/204 |
| 2007/0038889 A1* | 2/2007 | Wiggins et al. | 714/20 |

* cited by examiner

*Primary Examiner* — Mohammad S Rostami
(74) *Attorney, Agent, or Firm* — Schwegman Lundberg & Woessner, P.A.

(57) ABSTRACT

In an embodiment of a computer-based system, a database and attributes to access that database are provided. The computer-based system is configured for one or more process controls, each of the one or more process controls comprising a subset of the plurality of attributes. The computer-based system is further configured to enable access to the database using the one or more process controls.

12 Claims, 2 Drawing Sheets

SYSTEM AND METHOD FOR PROCESS CONTROLS IN MASTER DATA MODELING

BACKGROUND

Every business organization today, at least those of moderate to large size, uses computer-based systems to keep track of its business processes. Such systems may track every aspect of the business organization including personnel, raw materials, finished products, sales, and accounting. One manner of accomplishing this is to maintain a central computer system, with a master database containing all of the information that is maintained by the business organization. Then, when a particular division or individual in the business organization has to access that information, all of the information on a particular product, that is all of the raw material, sales, and accounting information, is retrieved for that division or individual. Such a centralized system, however, generates data in which the division or individual may have no interest. This results in systems that are difficult to use for at least the reason that the output resulting from such a query to the database results in an overload of information that must be sorted through to retrieve the information that is of use to a particular individual or division.

SUMMARY

Figure 1:
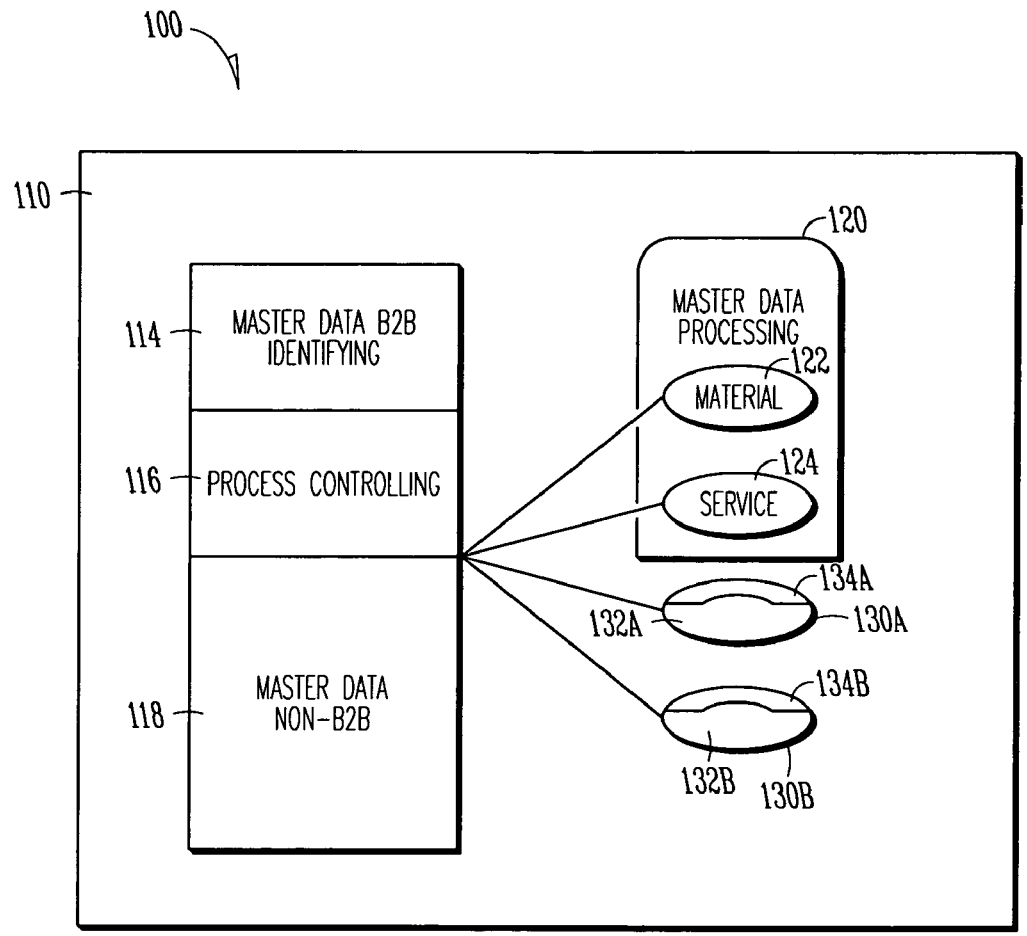
FIG. 1 illustrates an example embodiment of a system architecture of process controls and a database.

In an embodiment of a computer-based system, a database and attributes to access that database are provided. The computer-based system is configured for one or more process controls, each of the one or more process controls comprising a subset of the plurality of attributes. The computer-based system is further configured to enable access to the database using the one or more process controls.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

In most business organizations, as the business grows, the size and scope of its databases also grow. This is particularly true for business organizations that employ a centralized master database such as a product master database. If the business continues to grow, the problem does not improve, but becomes worse. This complexity may further be exacerbated when the database is composed of many data tables. The growth of a business organization many a time results in the size and scope of its database becoming unmanageable due to the multitude of the business processes using this database. Moreover, centralized databases are designed towards performance, not to ease of use. When users access such a database via a business object, the users are burdened with a plethora of data, most of which may be irrelevant to their particular business organization or process. Consequently, it is a strain for users to determine the data that is relevant to their functions and business processes. Moreover, a process itself cannot be sure that all the required attributes are maintained correctly. That is, users and business processes in one department cannot be sure if the data that they are presented with from another process is timely or accurate because they are not that familiar with that business process. This may lead to problems if a user or process nonetheless must rely on that data.

FIG. 1 illustrates an embodiment of an architecture 100 in which process controls are used in master data modeling. The architecture 100 includes a master database 110. The master database 110 includes a business to business (B2B) segment 114, a process controlling segment 116, and a non business to business segment 118.

A master data processing module 120 includes a material object 122 and a service object 124. The material object 122 maintains data that relates to materials used by the business, and the service object 124 maintains data that relates to the services of the business. Master data processing enables a business organization to manage all master data that describes for example its tangible and intangible products and that is relevant to control its business processes, such as sales, purchasing, planning, production, and accounting processes.

FIG. 1 further illustrates that the system 100 includes one or more process objects 130A and 130B. The process objects 130A and 130B include standard attributes 132A and 132B, and variable attributes 134A and 134B. The standard attributes define data that a process control always retrieves from the database, such as, for example, attributes identifying a master data object. The variable attributes define data that is not always retrieved from the database, but for which the system can be programmed to retrieve. Each process object contains its own attributes to retrieve only the data from the database in which that process control, and ultimately the business group associated with that process control, is interested in.

Process controls are groups of attributes that execute software that automates a specific process involving a fundamental entity of a database. Fundamental entities are real world elements such as a bank, a terminal, a company, or a personal computer. Process controls are groups of attributes that are used to control a specific process step, and each process control offers a different view into an object. Process controls are used to model the master database, i.e., process controls define which attributes are relevant for a specific process step; the process control defines the set of attributes necessary to run a process. The process controls are defined to make the complexity of the database, which itself contains hundreds of attributes and in an embodiment many tables, more manageable. At a high level, process controls are defined according to an outside-in design approach along the lines of the processes it supports. That is, the process control is not concerned with what is in the database, but what the process control wants to retrieve for the outside world. In other words, a process control is designed for business reasons (what data a business organization wants to review) and not technical reasons (how should that data be retrieved from the database). In an embodiment, the process controls are defined at design time, and hence can be shipped to one or more customers. The process controls represent the process controlling business logic of a business system.

In one particular embodiment, a business organization may implement several process controls, each process control using different attributes, to access the centralized database of the organization. Each process control is defined at design time to a particular division or group of the business organization. In this manner, each division or group, when accessing the database, will retrieve only the data that is pertinent to its group or division (e.g., the production department is probably not interested in the same information from the master database as is the sales department and vice versa).

In an embodiment, a first process control may deal with material sales, and be referred to as a material sales process control. Such a material sales process control may contain information relating to materials, for example finished goods, which may be needed in other process controls such as ones related to presales, sales, delivery, and customer service (such as the need for spare parts). The attributes of such a material sales process control may access data from a product master control database such as material price, tax treatment of the material, and quantity of material on hand.

In an embodiment, a process control may pertain to the sales of services (rather than materials), and may be referred to as a service product sales process control. Divisions such as presales, sales, and customer service may use such a service product sales process control, and they may be used for the sale of the service, the actual execution of the service, and the billing of the service. The attributes may cause such information as price, tax determination, and duration of the service to be retrieved from the master product database.

In an embodiment, a division such as customer service may need access to warranty information in the master database. For such a system, a warranty service process control may be implemented. Such a process control may deal with the assignment of a warranty to a material, a service, or an individual material. Additionally, the valuation of the services and/or spare parts may be required. Such attribute information may further require the services and the spare parts that are covered by the warranty.

In an embodiment, a process control may be implemented having attributes to access information from the master product database relating to individual material sales. Information on individual material may be of interest to presales, sales, and customer service groups. The attributes in this process control may return data relating to the individual material and sales of it, delivery of it, billing for it, the price of it, and the tax treatment of it. In an embodiment, a material sales process deals more with raw materials, and an individual material sales process deals more with finished products.

In another embodiment, a process control may be implemented at design time to deal with the financial aspects related to a material. Such a process control may be referred to as a material financials process control, and may deal with inventory valuation.

In an embodiment, a process control may handle the logistical processes of a business organization, such as the inventory management. Such a process control may be referred to as a material inventory process control. Attributes for such a process control may cause inventory serialization data to be returned to the user accessing the process control.

In an embodiment, a department such as the shipping or distribution department may need a process control to retrieve information relating to the delivery of a material. Such a process control may be referred to as a material delivery process control. The attributes associated with the process control may relate to the item type for the delivery, and the units for the delivery.

In an embodiment, one or more divisions of a business organization may be interested in a process control that deals with procurement planning. Such a process control may be referred to as a material supply planning process control. The attributes of such a process control may relate to lot size planning (i.e., lot of materials), requirement consumption, in-house production, and external procurement.

In an embodiment, a department of a business organization may want to determine the availability of a material. A process control may be implemented at design time to serve such a need, and may be referred to as a material availability confirmation process control. The attributes of such a process control may determine the type of availability check, for example, determining the earliest date when a single unit will be available, or determining if a certain number of units will be available during a certain week (and reserving those units).

In an embodiment, one or more divisions may be interested in information that relates to the use of a material in procurement related processes. Such a process control may be referred to as a material procurement process control, and may relate to such things as the order unit in which purchase orders for materials are transferred to suppliers. Similarly, a division may be interested in information about a service product that is required to use the service product in procurement relevant processes. It may include the order unit in which service orders are transferred to suppliers.

Figure 2:
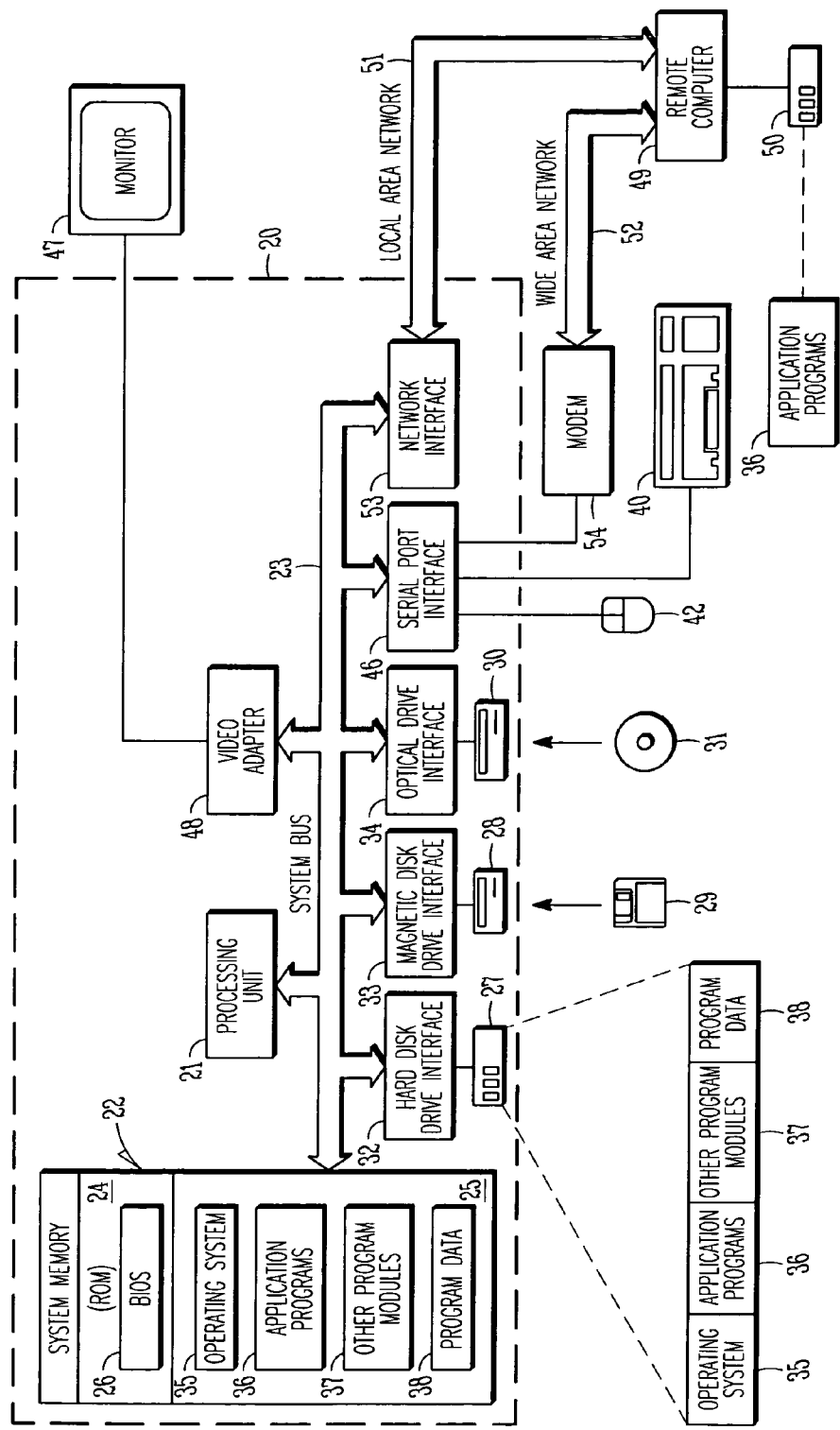
FIG. 2 illustrates an example embodiment of a computer system upon which one or more embodiments of the invention may operate.

FIG. 2 is an overview diagram of a hardware and operating environment in conjunction with which embodiments of the invention may be practiced. The description of FIG. 2 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 2, a hardware and operating environment is provided that is applicable to any of the servers and/or remote clients shown in the other Figures.

As shown in FIG. 2, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 2 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A process comprising:
providing a master database in a central computer-based system, the master database comprising all data for all divisions of a business organization;
providing a plurality of attributes to access the master database;
configuring the central computer-based system for process controls, each of the process controls comprising a subset of the plurality of attributes, wherein the subset for a particular process control is identified at the time of design of the particular process control;
configuring the central computer-based system to enable access to the master database using the process controls;
defining a first process control to include standard attributes, wherein standard attributes define data that the process control always retrieves from the master database;
defining a second process control to include standard attributes and variable attributes, wherein variable attributes define data that the process control does not always retrieve from the master database, but define data for which the process control can be programmed to retrieve, such that a particular process control includes only the attributes to retrieve data from the master database that are relevant to the division that is associated with the particular process control; and
providing a plurality of process controls, each process control associated with a particular division of the business organization, such that each division of the business organization retrieves only the data from the master database that are relevant to the particular division;

wherein the plurality of process controls include a material sales process control comprising data relating to materials, a service product sales process control comprising data relating to sales of services, a warranty service process control comprising data relating to warranty information, an individual material sales process control comprising data relating to individual material sales, a material financials process control comprising financial data related to a material, a material inventory process control comprising logistical data of a business organization, a material delivery process control comprising data relating to shipping and distribution, a material supply planning process control comprising data relating to procurement planning, a material availability confirmation process control comprising data relating to material availability, a material procurement process control comprising data relating to material procurement, and a service product procurement process control comprising data relating to service product procurement.

2. The process of claim 1, wherein the master database comprises a plurality of tables.

3. The process of claim 1, further comprising enabling the computer-based system to retrieve a subset of attributes from the master database according to each process control.

4. The process of claim 1, wherein the plurality of attributes of each process control is related to a particular business process of a business organization.

5. A system comprising:
a computer processor adapted to provide a master database in a central computer-based system, the master database comprising all data for all divisions of a business organization;
a computer processor adapted to provide a plurality of attributes to access the master database;
a computer processor adapted to configure the central computer-based system for process controls, each of the process controls comprising a subset of the plurality of attributes, wherein the subset for a particular process control is identified at the time of design of the particular process control;
a computer processor adapted to configure the central computer-based system to enable access to the master database using the process controls; and
defining a first process control to include standard attributes, wherein standard attributes define data that the process control always retrieves from the master database;
defining a second process control to include standard attributes and variable attributes, wherein variable attributes define data that the process control does not always retrieve from the master database, but define data for which the process control can be programmed to retrieve, such that a particular process control includes only the attributes to retrieve data from the master database that are relevant to the division that is associated with the particular process control; and
providing a plurality of process controls, each process control associated with a particular division of the business organization, such that each division of the business organization retrieves only the data from the master database that are relevant to the particular division;
wherein the plurality of process controls include a material sales process control comprising data relating to materials, a service product sales process control comprising data relating to sales of services, a warranty service process control comprising data relating to warranty information, an individual material sales process control comprising data relating to individual material sales, a material financials process control comprising financial data related to a material, a material inventory process control comprising logistical data of a business organization, a material delivery process control comprising data relating to shipping and distribution, a material supply planning process control comprising data relating to procurement planning, a material availability confirmation process control comprising data relating to material availability, a material procurement process control comprising data relating to material procurement, and a service product procurement process control comprising data relating to service product procurement.

6. The system of claim 5, wherein the master database comprises a plurality of tables.

7. The system of claim 5, further comprising a computer processor adapted to enable the central computer-base system to retrieve a subset of attributes from the master database according to each process control.

8. The system of claim 5, wherein the plurality of attributes of each process control is related to a particular business process of a business organization.

9. A tangible machine-readable storage device comprising instructions thereon for executing a process comprising:
providing a master database in a central computer-based system, the master database comprising all data for all divisions of a business organization;
providing a plurality of attributes to access the master database;
configuring the central computer-based system for process controls, each of the process controls comprising a subset of the plurality of attributes, wherein the subset for a particular process control is identified at the time of design of the particular process control;
configuring the central computer-based system to enable access to the master database using the process controls; and
defining a first process control to include standard attributes, wherein standard attributes define data that the process control always retrieves from the master database;
defining a second process control to include standard attributes and variable attributes, wherein variable attributes define data that the process control does not always retrieve from the master database, but define data for which the process control can be programmed to retrieve, such that a particular process control includes only the attributes to retrieve data from the master database that are relevant to the division that is associated with the particular process control; and
providing a plurality of process controls, each process control associated with a particular division of the business organization, such that each division of the business organization retrieves only the data from the master database that are relevant to the particular division;
wherein the plurality of process controls include a material sales process control comprising data relating to materials, a service product sales process control comprising data relating to sales of services, a warranty service process control comprising data relating to warranty information, an individual material sales process control comprising data relating to individual material sales, a material financials process control comprising financial data related to a material, a material inventory process control comprising logistical data of a business organization, a material delivery process control comprising data relating to shipping and distribution, a material supply planning process control comprising data relating to procurement planning, a material availability confirmation process control comprising data relating to material availability, a material procurement process control comprising data relating to material procurement, and a service product procurement process control comprising data relating to service product procurement.

10. The tangible machine-readable storage device of claim 9, wherein the master database comprises a plurality of tables.

11. The tangible machine-readable storage device of claim 9, further comprising instructions thereon for enabling the central computer-based system to retrieve a subset of attributes from the master database according to each process control.

12. The tangible machine-readable storage device of claim 9, wherein the plurality of attributes of each process control is related to a particular business process of a business organization.

* * * * *